Figure 1:
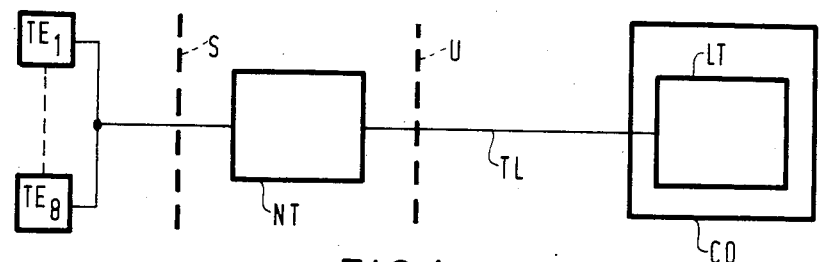

United States Patent [19]
Dekker et al.

[11] Patent Number: 4,797,904
[45] Date of Patent: Jan. 10, 1989

[54] TRANSMITTER FOR ISDN S-BUS INTERFACE CIRCUIT

[75] Inventors: Hendrikus J. Dekker; Johannes H. M. Velthof, both of Hilversum, Netherlands

[73] Assignee: AT&T and Philips Telecommunications B.V., Hilversum, Netherlands

[21] Appl. No.: 53,231

[22] Filed: May 22, 1987

[30] Foreign Application Priority Data

May 26, 1986 [NL] Netherlands ......................... 8601331

[51] Int. Cl.$^4$ ........................................... H04L 27/00
[52] U.S. Cl. ........................................ 375/60; 370/24; 375/7; 375/17; 375/36
[58] Field of Search ................. 375/17, 36, 59, 60, 375/68, 71, 73, 7; 370/24, 28, 29; 332/47; 178/63 B

[56] References Cited

U.S. PATENT DOCUMENTS

| | | | |
|---|---|---|---|
| 4,280,221 | 7/1981 | Chun et al. | 375/17 |
| 4,606,046 | 8/1986 | Ludwick | 375/17 |
| 4,649,548 | 3/1987 | Crane | 375/36 |

*Primary Examiner*—Benedict V. Safourek
*Attorney, Agent, or Firm*—Lucian C. Canepa

[57] ABSTRACT

In the future ISDN network, up to eight subscriber terminals for speech, data and image traffic can be connected to the network terminating circuit (NT). The interface between the subscriber terminals and the network terminating circuit - the S-interface - is specified in CCITT Recommendation I.430. The transmitter in the S-interface must satisfy many, sometimes conflicting, requirements. This is satisfied to an optimum extent by providing the transmitter with a bridge circuit formed by semiconductor switching elements which are controlled by a digital control circuit. According to the invention, the output current of the transmitter is maintained substantially constant with the aid of a differential amplifier connected to the bridge circuit.

3 Claims, 1 Drawing Sheet

TRANSMITTER FOR ISDN S-BUS INTERFACE CIRCUIT

The invention relates to a transmitter for an ISDN S-bus interface circuit for transmitting digital signals via a transmit line of a full-duplex four-wire line to one or a plurality of subscriber sets, which transmitter includes a bridge circuit formed by semiconductor switching elements having a control input connected to a digital control circuit for cross-wise rendering the switching elements conductive or non-conductive for transmitting a binary "zero" or rendering the switching elements non-conductive for transmitting a binary "one", a transverse branch of the bridge circuit including the primary winding of a transformer to the secondary winding of which the transmit line is connected, one side of the second transverse branch being connected to a voltage source.

A transmitter having the above-described structure, for transmitting digital signals is known from the British Pat. No. 1,598,679, entitled "Digital Data Transmission System Line Driver Circuits".

In future integrated services digital network (ISDN), any subscriber can access two 64 kb/s circuit switched channels (commonly refered to as B-channels) intended for speech and data, and also a 16 kb/s packet or message-switched channel (commonly referred to as the D-channel), more specifically intended for transmitting signalling messages. Up to eight subscriber's arrangements for speech, text, data and image traffic can be connected to the network terminating circuit (NT) of the ISDN-network. The interface between these subscriber's arrangements and the network terminating circuit—the S-interface circuit—is specified by the CCITT in recommendation I.430. The network terminating circuit is connected to (a line terminating circuit of) the subscriber exchange via a two-wire full-duplex transmission line. The net transmission rate is 144 kb/s.

The network termination circuit performs a plurality of functions, such as two-wire/four-wire conversion, echo cancellation, concentration and distribution. In the article "Konzept und Grundmerkmale des diensteintegrierenden digitalen Nachrichtennetzes ISDN" by P. Becker in Telcom Report 6 (1983), pages 164-169, the architecture of the subscriber access is described which is laid down in said CCITT recommendation I.430. One of its functions is transmitting and receiving the two 64 kb/s channels and the 16 kb/s channels via the four-wire full-duplex connection between the NT and the subscriber's arrangement. For that purpose the S-interface of the network terminating circuit must include a transmitter and a receiver. In accordance with the recommendation I.430, the transmitter must be arranged for transmitting AMI-encoded (alternate mark inversion), trivalent signals at a bit rate of 192 kb/s. The transmitter must satisfy very severe requirements as regards impedance, pulse masks, maximum line voltage, induced voltages (cross-talk), protection, permissible supply voltage tolerances, etc.

The present invention has for its object to provide a transmitter for an ISDN S-bus interface circuit of the type defined in the opening paragraph, by means of which the many, sometimes conflicting requirements imposed thereon can be satisfied to an optimum extent.

According to the invention, the transmitter for an ISDN S-bus interface circuit is characterized in that the other side of the second transverse branch is connected to a reference potential via a measuring resistor, that in addition the transmitter includes a differential amplifier a first input of which is maintained at a reference voltage and a second input is connected to the other side of the second transverse branch and a first output of which is connected to a control input of one of the switching elements and a second output is connected to a control input of one of the further switching elements, for maintaining the current through the measuring resistor at a substantially constant value.

It is advantageous when, at a polarity change from a binary "zero" to a binary "one" in the signal transmitted by the transmitter, the primary winding of the transformer is briefly short-circuited by having two of the switching elements conduct.

Employing the ISDN concept is not really attractive until the circuits applied therefor are integrable. The article "Telecom-chips für das neue ISDN-Kommunikationssystem HICOM" by G. Beckinger in Telcom Report 8 (1985), page 310-313 describes the basic possibility of integrating an S-bus interface circuit. The invention has for its object to provide an integrated circuit for use in an ISDN S-bus transmitter within which a highly reproduceable transmitter can be realized. According to the invention, the integrated circuit is therefore characterized in that the switching elements, the control circuit and the differential amplifier are implemented on one crystal and that the integrated circuit has a connection terminal for connecting the measuring resistor external of the circuit.

Providing the measuring resistor externally has the advantage that the resistance value thereof can be given a very high absolute accuracy.

Figure 2:
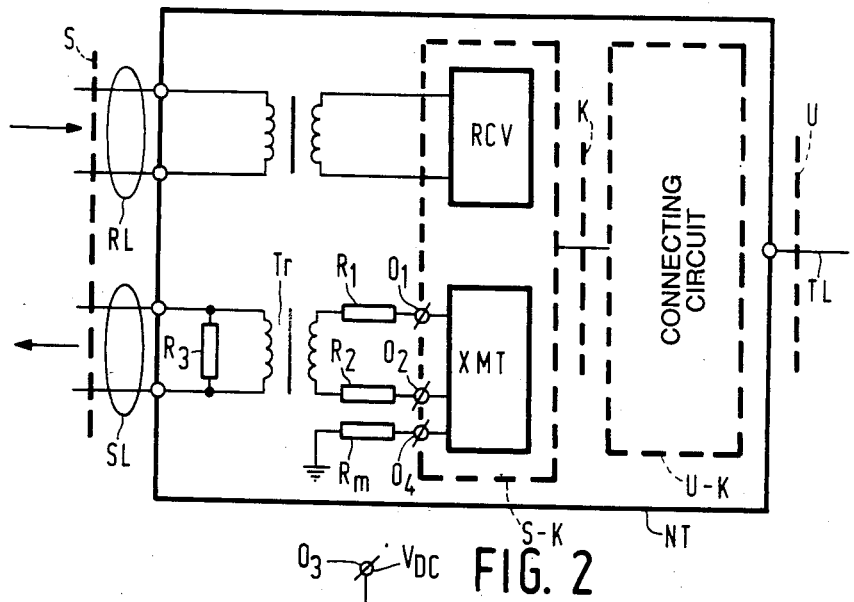
Figure 3:
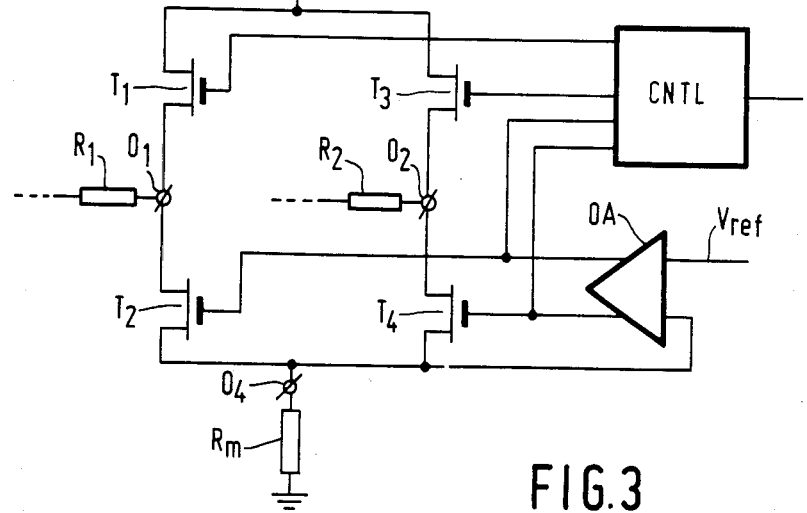

The invention and its advantages will now be described in greater detail by way of example with reference to the accompanying drawings in which corresponding portions in each of the different figures are given the same reference symbols, and in which FIG. 1 is a schematic representation of the digital supply and the subscriber's access in an ISDN communication system;

FIG. 2 shows a block circuit diagram of an ISDN network terminating circuit including a transmitter for the S-bus interface circuit according to the invention; and FIG. 3 shows a further practical example of a portion of the transmitter of FIG. 2.

FIG. 1 shows a portion of an ISDN communication system. A line terminating circuit LT which forms part of the central exchange CO is connected to the network terminating circuit NT via a 144 kb/s two-wire full-duplex (e.g. twisted wire) transmission line TL. Generally, the network terminating circuit NT is located at the subscriber's side and is suitable for connecting of a maximum of eight subscriber terminals $TE_1 \ldots TE_8$. The subscriber terminals $TE_i$ (i=1,2, ... 8) may be in the form of a telephone set, a facsimile apparatus, a data terminal, an arrangement for processing graphic or picture information, etc. The subscriber terminals TE have the disposal of two 64 kb/s circuit-switched channels for speech and data and one 16 kb/s packet or message-switched channels primarily for signalling purposes. A connection to the ISDN communication exchanges CO is effected via the network terminating circuit NT and the 144 kb/s transmission line TL. The interface between the subscriber terminals and the network terminating circuit is denoted as the S-interface and is specified in the CCITT recommendation I.430.

The interface between the network terminating circuit NT and the network (the transmission line LT) is denoted as a U-interface in the CCITT recommendation I.430.

The S-interface provides a four-wire connection to the subscriber terminals TE$_1$, a 2B+D channel being available for both directions (from and to the subscriber arrangements). Each B-channel has a capacity of 64 kb/s. The signalling messages required for the two B-channels are transmitted in packet-switched form through the D-channel (16 kb/s).

FIG. 2 shows a network terminating circuit NT in greater detail. The network terminating circuit NT predominantly consists of two parts, namely a U-K and a S-K part. The U-K part which is not shown in further detail, constitutes the connecting circuit between the U-interface and the K-interface. In that circuit, the signals from and for the transmission line are generated, regenerated or detected and, for example, the two-wire/four-wire conversion is effected. The K-interface is an interface which is not specified by the CCIT but by the telecommunication industry.

The S-K part of the network terminating circuit NT accomodates a transmitter XMT and a receiver RCV. The receiver RCV detects the signals transmitted by the subscriber terminals TE (FIG. 1) via the receive line RL and conveys them, for example, to the U-K circuit—via the K-interface—for transmission via the transmission line TL. AMI-encoded signals are transmitted to the subscriber arrangement by the transmitter XMT via the transmitline SL. (As is known, in an AMI encoded signal a first binary "zero" is encoded as a signal $+V$, the second binary "zero" as a signal $-V$, the third binary "zero" again as $+V$., whilst a binary "one" is encoded as a signal having the value 0. Consequently the transmitted AMI signal is a trivalent signal.) The information content of these signals is conveyed—for example via the transmission line TL and the U-K circuit—to the transmitter XTR. The coupling between the transmitter XMT and the transmit line SL will be described in greater detail after the description of the transmitter architecture.

The transmitter itself is shown in FIG. 3. The transmitter includes four switching elements in the form of MOS transistors T$_1$, T$_2$, T$_3$ and T$_4$ incorporated in a (Wheatstone) bridge circuit. The gates of the transistors are all connected to a digital control circuit CNTL for (predominantly) causing the switching elements T$_1$, T$_2$, T$_3$ and T$_4$ to conduct or not conduct cross-wise for, transmission of a binary "zero". This implies that if transistors T$_1$ and T$_4$ conduct, transistors T$_2$ and T$_3$ are non-conductive and vice versa. When a binary "one" is transmitted, all transistors T$_1$ through T$_4$ are adjusted to the non-conducting state. A first transverse branch of the bridge circuit is constituted by the series arrangement between the terminals O$_1$ and O$_2$ of a first resistor R$_1$, a primary winding of transformer Tr (FIG. 2) and a second resistor R$_2$. One end of a second transverse branch of the bridge circuit, namely terminal O$_3$ is connected to a d.c. voltage source having a fixed potential V$_{DC}$. The second end—terminal O$_4$—is connected to ground potential via the measuring resistor R$_m$. In addition, the transmitter includes an operational amplifier OA a first input of which is connected to one side of the measuring resistor R$_m$ and to a second input of which a reference potential V$_{ref}$ is applied.

The differential amplifier OA has the following function. If the bridge circuit is operated, current will flow from the supply terminal O$_3$ to earth via transistor T$_1$ (T$_3$), resistor R$_1$ (R$_2$), the primary winding of transformer Tr, resistor R$_2$ (R$_1$), transistor T$_4$ (T$_2$) and the measuring resitor R$_m$. The voltage across the measuring resistor R$_m$ is measured by the differential amplifier OA against the reference voltage V$_{ref}$. The output voltage of the differential amplifier OA will increase the control voltage for the transistors T$_2$ and T$_4$ or reduce it, causing the output current (that is to say the current through the primary winding) to be influenced. Thus, the output current—within certain limits independently of the load—will be kept substantially constant.

The switching slopes of the control signals of the control circuit are very steep. For the purpose of limitation and protection, a voltage limitation on the supply voltage V$_{DC}$ is provided and a current protection with the aid of the resistors R$_1$ and R$_2$. Instead of this passive limitation an active limitation is however alternatively possible, it then however being necessary to pay special attention to problems caused by "overshoot" because of the steep slopes.

The transformer Tr is used for the purpose of electric separation. A resistor R$_3$ which has for this object to adjust the input impedance of the transmitter to the value required by CCITT-I.430 is arranged in parallel with the secondary winding (FIG. 2).

At the transition of transmitting a binary "zero" to a "one" ringing occurs, inter alia owing to the leakage inductance of the transformer T$_r$. This is cancelled by short-circuiting the transformer for 200 to 300 nsec after the transition from binary "zero" to a binary "one". This is accomplished by maintaining the transistors T$_2$ and T$_4$ (or T$_1$ and T$_3$) in the conducting state during that time.

The transistors T$_1$-T$_4$, the control circuit CNTL and the operational amplifier are preferably implemented in one integrated circuit. The measuring resistor is kept externally in view of the high absolute and relative accuracy to be imposed on the constancy of the output current.

What is claimed is:

1. A transmitter for an ISDN S-bus interface circuit for transmitting digital signals via a transmit line of a full-duplex four-wire line to one or a plurality of subscriber sets, which transmitter includes a bridge circuit formed by semiconductor switching elements each having a control input connected to a digital control circuit for cross-wise rendering selected ones of the switching elements conductive or non-conductive for transmitting a binary "zero" or rendering all the switching elements non-conductive for transmitting a binary "one", said bridge circuit including first and second transverse branches whose ends are connected between adjacent ones of said switching elements, said first transverse branch of the bridge circuit including the primary winding of a transformer to the secondary winding of which the transmit line is connected, said second transverse branch including a voltage source, characterized in that the second transverse branch includes a measuring resistor in series with said reference potential, that in addition the transmitter includes a differential amplifier a first input of which is maintained at a reference voltage and a second input of which is connected to said measuring resistor in said second transverse branch and a first output of which is connected to a control input of one of the switching elements and a second output of which is connected to a control input of one of the further switching elements for maintaining the current through the measuring resistor at a substantially constant value.

2. A transmitter as claimed in claim 1, characterized in that when the polarity changes from a binary "zero" to a binary "one" in the signal transmitted by the transmitter the primary winding of the transformer is briefly short-circuited by causing two of the switching elements to conduct.

3. An integrated circuit for use in a transmitter as claimed in any one of the preceding claims, characterized in that the switching elements, the control circuit and the differential amplifier are implemented on one crystal and that the integrated circuit has a connecting terminal for the connection of the measuring resistor which is external of the circuit.

* * * * *